United States Patent [19]

Milbourn

[11] Patent Number: 5,103,882
[45] Date of Patent: Apr. 14, 1992

[54] ROTARY CUTTER WHEEL AND REMOVABLE TOOTH STRUCTURE

[76] Inventor: David E. Milbourn, Rte. 3, Box 696D, Hoquiam, Wash. 98550

[21] Appl. No.: 757,238

[22] Filed: Sep. 10, 1991

[51] Int. Cl.⁵ .................................. A01G 23/08
[52] U.S. Cl. ........................ 144/34 R; 56/295; 407/33; 407/50; 144/241
[58] Field of Search ............ 30/347, 276; 83/838, 83/839, 840; 144/218, 34 R, 241, 237, 231; 56/295, 255, DIG. 17; 407/33, 47, 50

[56] References Cited

U.S. PATENT DOCUMENTS

| | | | |
|---|---|---|---|
| 28,310 | 1/1975 | Krekeler | 299/93 |
| 1,313,628 | 8/1919 | Ford | 30/347 |
| 1,797,026 | 3/1931 | Sharp | 407/33 |
| 2,028,784 | 1/1936 | Jennett | 30/276 |
| 2,216,790 | 10/1940 | Sebade | 56/303 |
| 3,633,637 | 1/1972 | Kolesh | 83/840 |
| 4,043,104 | 8/1977 | Jones | 56/295 |
| 4,229,933 | 10/1980 | Berhard | 56/295 |
| 4,250,696 | 2/1981 | Hash | 56/14.7 |
| 4,269,244 | 5/1981 | Kinsella | 144/231 |
| 4,360,068 | 11/1982 | Stephenson et al. | 172/540 |
| 4,446,897 | 5/1984 | Kurelek | 144/34 |
| 4,484,560 | 11/1984 | Tanigawa | 407/50 |
| 4,611,460 | 9/1986 | Parker | 56/295 |
| 4,621,870 | 11/1986 | Levefelt | 299/91 |
| 4,651,510 | 3/1987 | Malutich | 56/295 |
| 4,744,278 | 5/1988 | Wright | 83/839 |
| 4,750,320 | 6/1988 | Liebl | 56/295 |
| 4,769,977 | 9/1988 | Milbourn | 56/15.2 |
| 4,776,639 | 10/1988 | Braun et al. | 299/91 |
| 4,779,407 | 10/1988 | Pattee | 56/295 |
| 4,813,325 | 3/1989 | Gelman | 83/844 |
| 4,815,264 | 3/1989 | Mijnders | 56/295 |
| 4,852,277 | 8/1989 | Ward | 37/117.5 |
| 4,881,438 | 11/1989 | Pinney | 83/840 |
| 4,891,893 | 1/1990 | Bowes, Jr. | 37/67 |
| 4,899,522 | 2/1990 | Munger | 56/10.4 |
| 4,960,157 | 10/1990 | Sheets | 144/34 |
| 4,974,649 | 12/1990 | Manning | 144/235 |
| 4,987,935 | 1/1991 | Corcoran et al. | 144/34 R |
| 5,054,967 | 10/1991 | Noguchi et al. | 407/50 |

*Primary Examiner*—Douglas D. Watts
*Assistant Examiner*—Hwei-Siu Payer
*Attorney, Agent, or Firm*—Joan H. Pauly

[57] ABSTRACT

A plurality of cutter teeth (50) are mounted on outer peripheral portions of a rotary cutter wheel (22). Each tooth (50) forms a socket (74) that receives a projections (26) on the wheel (22). Opposite parallel inner socket surfaces (76) and a parallel outer surface (78) of the tooth (50) abut side surfaces (28) of the projection (26) and an edge surface (34) on the wheel (22) to snugly engage the tooth (50) on the wheel (22). The abutting surfaces (76, 28 and 78, 34) are substantially tangent to the wheel's cutting direction. A roll pin (80) may be used to further secure the tooth (50). The pin (80) fits snugly in a hole (70) in the tooth (50) and loosely in a hole (32) in the projection (26). Upper and lower tooth walls (56, 58) preferably extend along opposite surfaces of the wheel (22) beyond the projection (26).

20 Claims, 3 Drawing Sheets

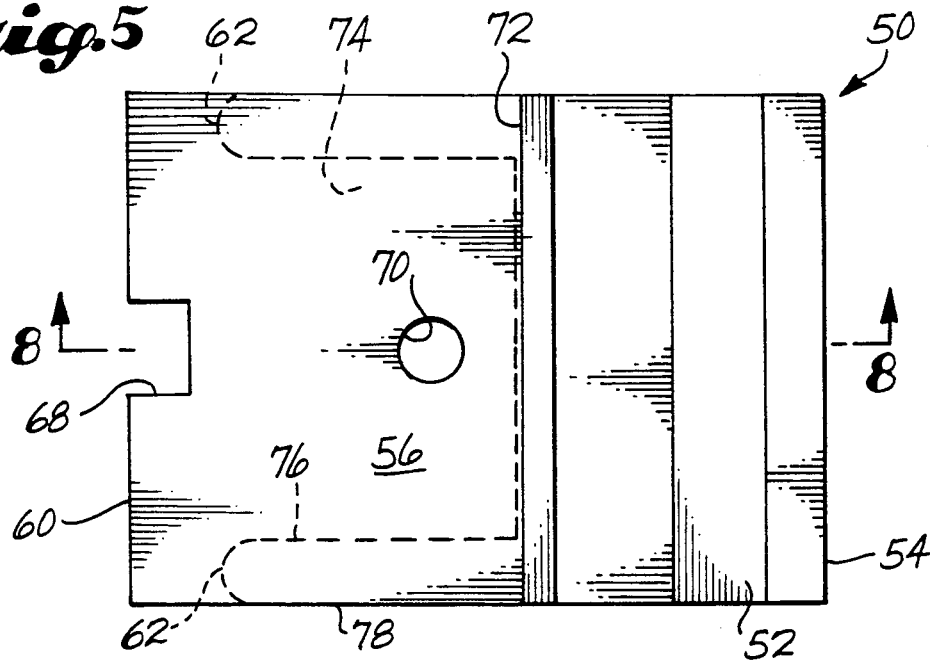
Fig. 5
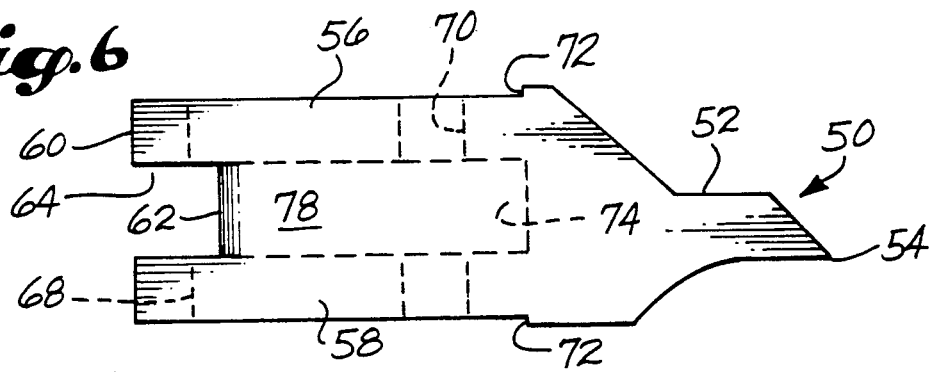
Fig. 6
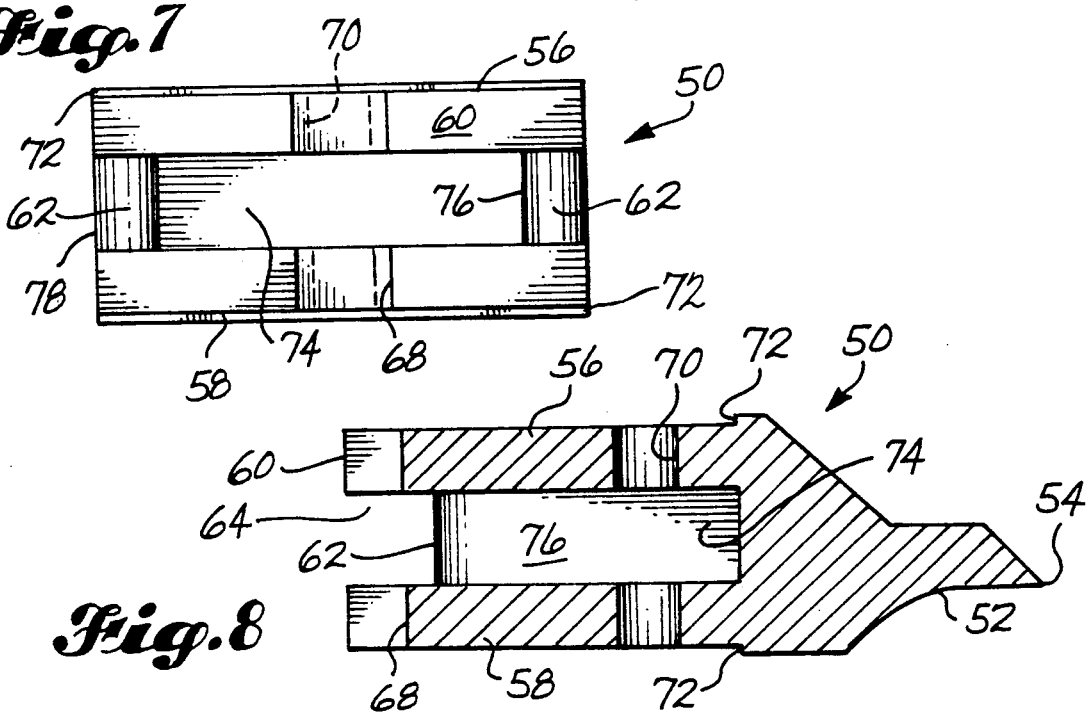
Fig. 7
Fig. 8

ROTARY CUTTER WHEEL AND REMOVABLE TOOTH STRUCTURE

TECHNICAL FIELD

This invention relates to rotary cutters and, more specifically, to such a cutter having a base portion to which a plurality of teeth are removably secured, each said tooth having a plurality of surfaces that abut surfaces on the base portion of the cutter that are substantially tangent to the cutting direction.

BACKGROUND INFORMATION

Rotary cutters are used in various applications, including brush cutting and tree clearing and trimming applications. Whatever the use for rotary cutting apparatus, it is desirable to be able to quickly and easily remove and install cutting teeth on the cutter to replace or sharpen worn or damaged teeth, or substitute a different type of tooth for a different operation. A number of different types of removable tooth structures have been proposed and/or patented. Some of the problems that are associated with known tooth structures are relative difficulty in removing and/or installing the teeth, relatively complex structure of the teeth themselves or the mounting structure for the teeth, and vulnerability of the teeth to being broken off or dislodged.

DISCLOSURE OF THE INVENTION

The subject of the present invention is rotary cutting apparatus. According to an aspect of the invention, the apparatus comprises a cutter base and a plurality of removable teeth. The base is mountable for rotation about an axis and defines a circular cutting direction perpendicular to the axis. The base includes radially outer peripheral portions with a plurality of projections and a plurality of edge surfaces corresponding to the projections, respectively. The edge surfaces extend substantially tangent to the cutting direction. Each projection has opposite side surfaces substantially tangent to the cutting direction, and an end surface extending between the side surfaces. The base defines a slot between each edge surface and a radially adjacent one of the side surfaces of the corresponding projection. The slot has an open end radially adjacent to the projection end surface. There is a removable tooth corresponding to each projection. Each tooth defines a socket with opposite inner surfaces. The projection is snugly received into the socket with the socket inner surfaces and an outer surface of the tooth abutting the projection's side surfaces and edge surface, respectively, to removably secure the tooth to the base. The socket provides clearance for the end surface of the projection to allow cutting forces to tend to tighten engagement of the projection in the socket.

The shapes of the projection and the teeth may be varied. However, in the preferred embodiment, the inner surfaces of the socket and the tooth outer surface are essentially parallel to each other, and the projection is substantially rectangular to help maximize the simplicity of structure of the invention. The overall form of the cutter base may also be varied. In the currently preferred embodiment, the cutter base comprises a substantially disk-shaped cutter wheel. Other possible embodiments of the cutter base include a cutter bar having its axis of rotation at its longitudinal center.

The apparatus of the invention is preferably provided with additional securing of the tooth onto the projection in order to enhance resistance to unintentional displacement of the tooth from its installed position on the projection. In the preferred embodiment of the invention, each projection has a first hole with a first width extending therethrough. The corresponding tooth has a second hole with a second width extending therethrough and aligned with the first hole. The second width is less than the first width. The apparatus further comprises a pin interference fit into the second hole and loosely received through the first hole. This further secures the tooth on the projection while maintaining a tendency of cutting forces to tighten engagement of the tooth on the projection.

A preferred feature of the invention is the inclusion of confronting surfaces on opposite sides of the projection. In apparatus having this feature, the slot defined by the base has a closed end opposite its open end. The base defines a confronting surface radially outwardly of the projection. The tooth has a pair of rear surfaces positioned on opposite sides of its socket and confronting the closed end and the confronting surface, respectively. Another preferred feature, which is preferably provided in combination with the last described preferred feature, is the feature of offset rear surfaces on the tooth. The tooth has opposite top and bottom portions terminating in an end portion that defines a socket opening through which the projection is received. Each of the rear surfaces on the tooth extends between the top and bottom portions and is inwardly offset from the end portion to permit the top and bottom portions to extend over opposite top and bottom surfaces of the base beyond the projection. This provides additional support for the tooth.

According to another aspect of the invention, the apparatus comprises a cutter base, a plurality of removable teeth, and a plurality of pins. The base is mountable for rotation about an axis and defines a circular cutting direction perpendicular to the axis. The base includes radially outer peripheral portions with a plurality of projections extending substantially tangent to the cutting direction. Each projection has opposite side surfaces and an end surface extending between the side surfaces. The projection has a first hole with a first width extending therethrough. The teeth correspond to the projections. Each tooth defines a socket with opposite inner surfaces. The projection is snugly received into the socket with the inner surfaces abutting the projection's side surfaces to removably secure the tooth to the base. The socket provides clearance for the end surface to allowing cutting forces to tend to tighten the projection in the socket. Each tooth has a second hole with a second width extending therethrough and aligned with the first hole in the corresponding projection. The second width is less than the first width. The pins are positioned in the holes as described above The apparatus may also include one or more of the other features discussed above.

The apparatus of the invention has a number of advantages. The apparatus allows for quick and easy removal and installation of teeth on the cutter base. The apparatus is also relatively simple in structure and can be manufactured and maintained at a reasonable cost. The plural abutting surface arrangement of the invention enhances the stability of the tooth attachment to the cutter base and helps prevent movement of the tooth relative to the base. The loosely mounted pin provides further security against displacement and adds to the safety of the apparatus. The solid securing of the teeth to the cutter base in turn enhances the cutting effectiveness of the cutting apparatus and helps minimize wearing of the apparatus to further increases its cost effectiveness. The apparatus of the invention also has the advantage of being highly versatile. It can be used in a number of different types of applications and can accommodate different types of rotary cutters and various types of teeth.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 5 is a plan view of the tooth shown in FIGS. 1-4.

FIG. 6 is a side view of the tooth shown in FIGS. 1-5.

FIG. 7 is a rear end view of the tooth shown in FIGS. 1-6.

FIG. 8 is a sectional view taken along the line 8—8 in FIG. 5.

BEST MODE FOR CARRYING OUT THE INVENTION

The drawings show cutting apparatus that is constructed in accordance with the invention and that constitutes the best mode of the invention currently known to the applicant. The drawings illustrate the mounting of the cutting apparatus on a cutter head 2. It is anticipated that the primary use of the apparatus of the invention will be in connection with brush cutters having brush cutting heads mounted on articulated booms. An example of such a brush cutter is disclosed in U.S. Pat. No. 4,769,977, granted Sept. 13, 1988, to the present applicant. It is of course to be understood that the apparatus of the invention may also be used with other types of equipment.

Figure 1:
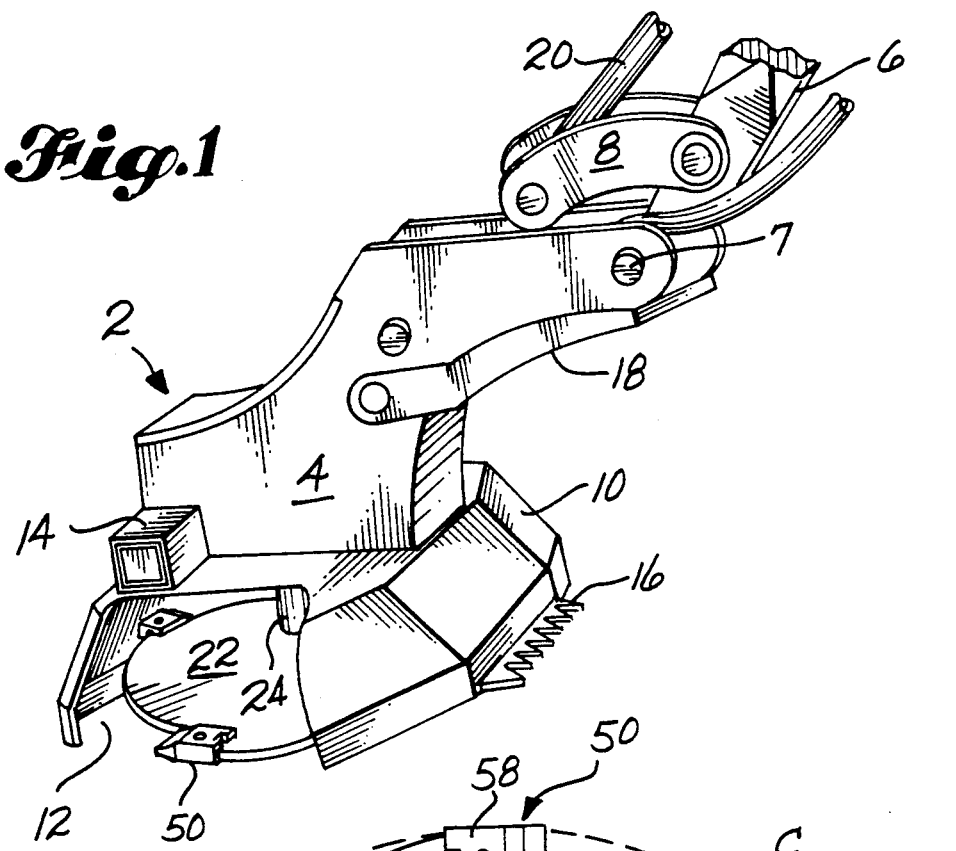
FIG. 1 is a pictorial view of a brush cutter head on which the preferred embodiment of the apparatus of the invention is mounted.
Figure 2:
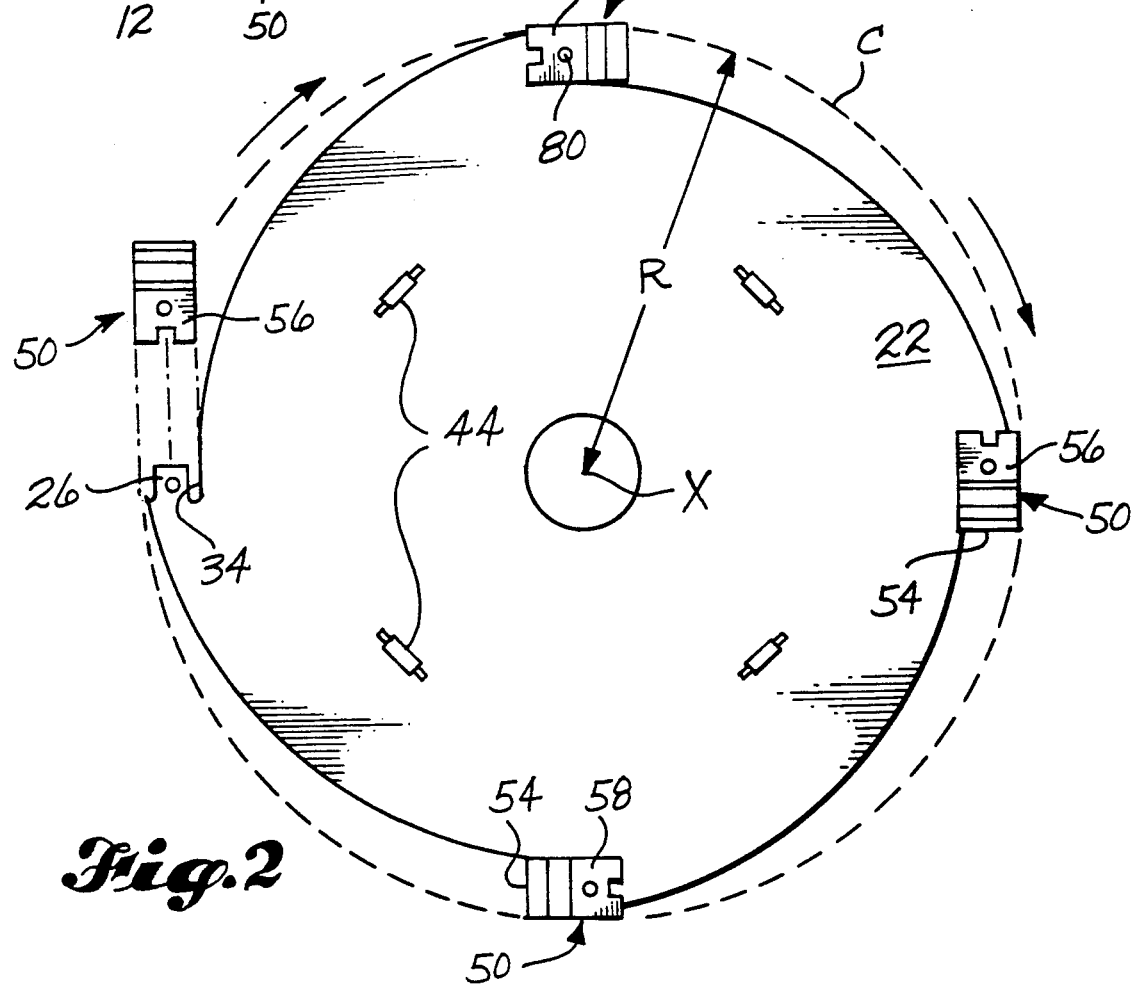
FIG. 2 is a partially exploded top plan view of the preferred embodiment shown in FIG. 2.

Referring to FIG. 1, the cutter head 2 shown therein has a housing 4 with a protective shroud 10 formed on the bottom thereof. The housing 4 is mounted on a boom 6 by means of a pivot pin 7 and a pair of links 8. The shroud 10 has a side opening 12 that exposes a portion of a cutter wheel 22 mounted on the housing 4. The wheel 22 is secured to a rotatable shaft 24 for rotation about an axis X (FIG. 2). As shown, the cutter head 2 includes a retractable spraying device 14, a rake 6 on its lower rear edge, and a pivotable thumb 18 which pivots toward the rake 16 to grasp out brush and other objects. An actuator 20 carried by the boom 6 pivots the head 2 relative to the boom 6. The head shown in FIG. 1 is disclosed in more detail in the applicant's copending application Ser. No. PCT/US90/05109, filed Sept. 11, 1990 in the U.S. Receiving Office. It is only one example of a type of brush cutter head on which the apparatus of the invention may be installed.

The apparatus of the invention is illustrated in FIG. 2 and in more detail in FIGS. 3-8. The apparatus includes a cutter base mountable for rotation about an axis and defining a circular cutting direction perpendicular to the axis. Referring to FIG. 2, in the illustrated preferred embodiment, the cutter base takes the form of a substantially disk-shaped cutter wheel 22. The wheel 22 is mountable to rotate about a center axis X and has a circular cutting direction indicated by the arrows and the broken line circle C in FIG. 2. The cutting circle C is defined by the radially outermost peripheral portions of cutting teeth 50 mounted on the wheel 22, as described further below.

The radially outer peripheral portions of the wheel 22 include a plurality of projections 26 for mounting the teeth 50. As shown in FIG. 2, the wheel 22 has four projections 26 on which four teeth 50 are mounted. The number of teeth may be varied to accommodate different cutter wheel sizes and/or the requirements of different cutting operations. The wheel 22 may also be provided with additional teeth, such as the teeth 44 shown in FIG. 2. The teeth 44 may be provided on either or both the top and bottom surfaces of the wheel 22.

Figure 3:
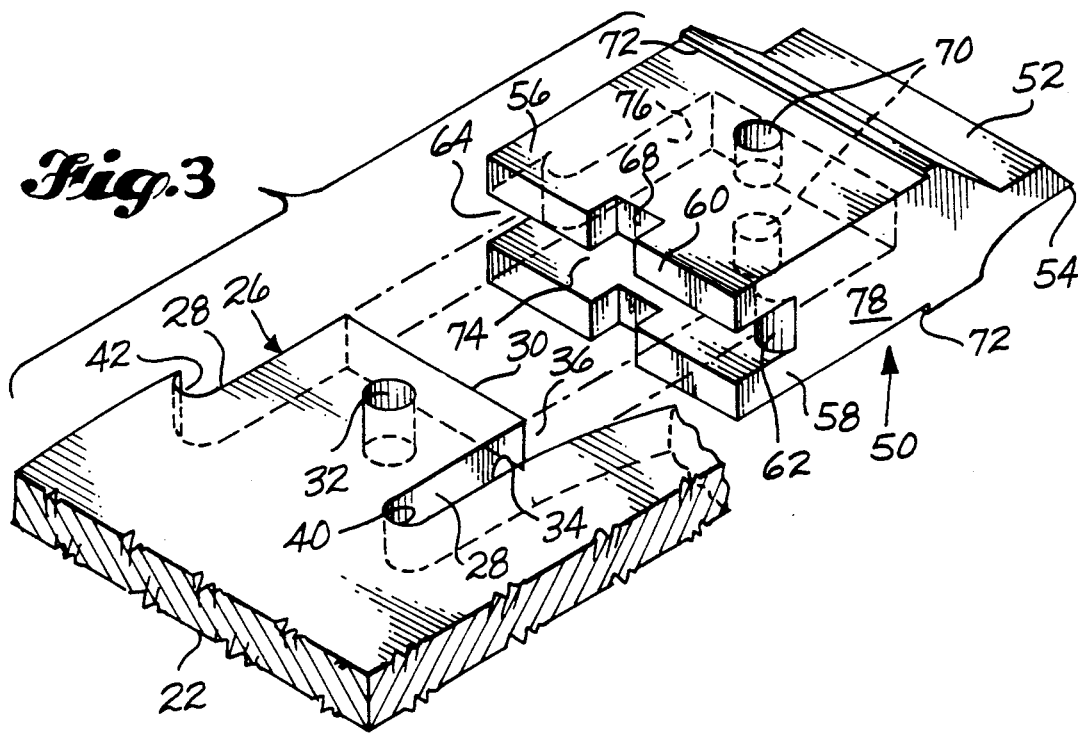
FIG. 3 is an enlarged fragmentary pictorial view of one of the teeth and a portion of the cutter base shown in FIGS. 1 and 2.
Figure 4:
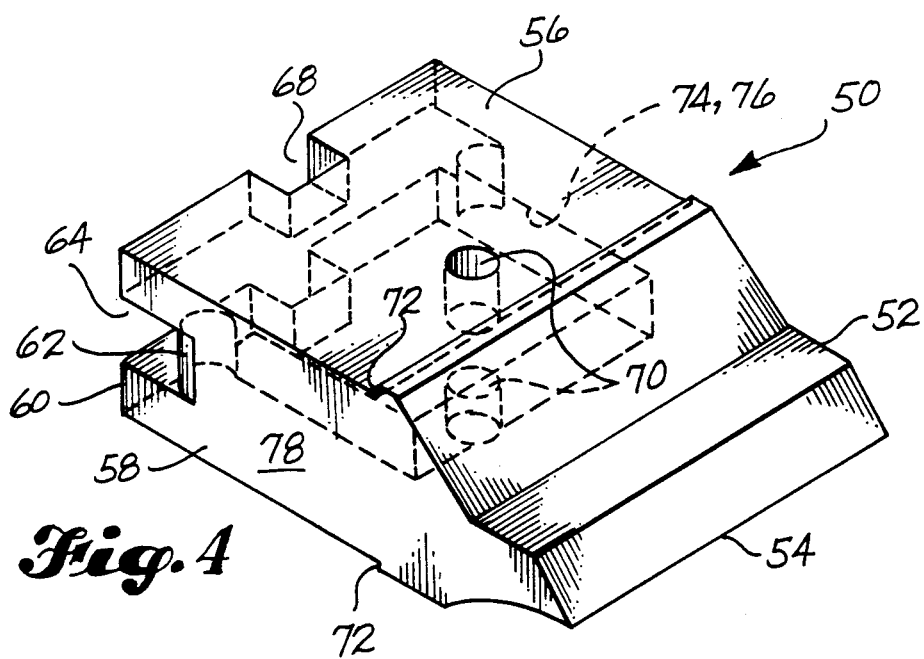
FIG. 4 is a pictorial view of the tooth shown in FIGS. 1-3 looking toward the cutting edge.

The cutter wheel 22 preferably has identical mounting structure for each of the teeth 50. The details of one of the projections 26 and its surrounding structure are shown in FIG. 3. The projection 26 is preferably substantially rectangular. It projects from the main body of the cutter wheel 22 in a direction substantially tangent to the cutting direction of the wheel 22. The projection 26 has opposite side surfaces 28 that are preferably essentially parallel to each other and to a direction tangent to the cutting direction. The side surfaces could also taper toward each other in a forward direction. The forward outer end surface 30 of the projection 26 extends between the side surfaces 28. A hole 32 extends vertically through the projection 26. If desired, the wheel 22 may be reinforced around the projection 26. For example, a strengthening rib (not shown) could be positioned behind the projection 26.

The cutter wheel 22 has an edge surface 34 that is radially adjacent to the radially inner side surface 28 of the projection 26 and is separated therefrom by a slot 36. The slot 36 has an open end radially adjacent to the end surface 30 of the projection 26, and an opposite closed end 40 radially adjacent to the base of the projection 26. The edge surface 34 is preferably essentially parallel to the adjacent side surface 28 and substantially tangent to the cutting direction. However, the edge surface 34 could also have a radially inward taper toward the open end of the slot 36.

As shown, the side surfaces 28 of the projection 26 and the wheel edge surface 34 are parallel or nearly parallel to the tangent to the cutting direction at the tooth cutting edge 54. This is the currently preferred orientation. However, the orientation may be varied, such as by angling the surfaces 28, 34 in a radial direction. All that is required is that the surfaces 28, 34 be substantially tangent to the cutting direction. The term "substantially tangent" is intended to be understood as indicating that the orientation is close enough to being parallel to the tangent to maintain a self-tightening action of the tooth 50 on the projection 26 due to the action of cutting forces on the tooth 50. The abutting surfaces 28, 34 may also be angled in an upward or downward direction, in addition to or instead of angling them radially, without departing from the spirit and scope of the invention.

The wheel 22 preferably forms a pair of confronting surfaces on radially opposite sides of the projection 26. One of these confronting surfaces is provided by the closed end 40 of the slot 36. The other confronting surface 42 is formed adjacent to the radially outermost periphery of the cutter wheel 22 and has the same rounded configuration as the closed end surface 40. The symmetrical configuring of the projection 26 and its accompanying confronting surfaces 40, 42 is preferred, in combination with a symmetrical configuration of the rear portion of the tooth 50, in order to permit the tooth 50 to be reversibly mounted on the projection 26.

The details of the structure of the currently preferred embodiment of the tooth 50 are shown in FIGS. 3-8. The tooth 50 is made from cast alloy steel and has opposite top and bottom portions 56, 58. Since the tooth 50 is reversibly mountable on the projection 26, either of the portions 56, 58 may be above the other portion 56, 58 in a particular installation. However, in order to facilitate the description of the tooth 50, the portion.56 will hereinafter be referred to as the top portion.

The top and bottom portions 56, 58 are in the form of top and bottom walls 56, 58 which define vertically therebetween a socket 74. The sides of the socket are defined by sidewalls of the tooth 50 which connect the top and bottom walls 56, 58. The front end portion 52 of the tooth 50 terminates in a cutting edge 54. The configuration of the front portion 52 and its cutting edge 54 may be varied in accordance with the needs of a particular application. The configuration shown in FIGS. 3, 4, 6, and 8 is currently preferred for brush clearing and tree trimming applications. The front portion 52 is dimensioned to give the tooth 50 a one sixteenth inch kerf, i.e. to position the cutting edge 54 one sixteenth inch below the bottom, or one sixteenth inch above the top, of the cutter wheel 22.

The top and bottom walls 56, 58 of the tooth 50 terminate in rear end portions 60 which form the rear portion of the tooth 50. The rear portion 60 defines a socket opening between the spaced rear edges of the top and bottom walls 56, 58. The projection 26 on the cutter wheel 22 is received into the socket 74 through this opening. The rear end portion 60 has a center notch 68 extending vertically therethrough for receiving a punch to assist in detaching the tooth 50 from the projection 26.

The rear surfaces 62 of the sidewalls of the tooth 50 are offset inwardly from the outer rear end 60 of the tooth 50. This offset results in the forming of a horizontal slot 64 extending all the way through the tooth 50 between the rear portions 60 of the top and bottom walls 56, 58. When the tooth 50 is installed on the projection 26, a portion of the cutter wheel 22 behind the projection 26 is received into this slot 64 so that the top and bottom walls 56, 58 of the tooth 50 extend over opposite top and bottom surfaces of the wheel 22 beyond the projection 26. This provides additional support for the tooth 50. The rear surfaces 62 of the tooth sidewalls have a rounded configuration that conforms to the rounded configuration of the confronting surfaces 40, 42 on the wheel 22. The rear surfaces 62 may be normally spaced from the confronting surfaces 40, 42 or may be in contact therewith to react impact forces and support the tooth 50. In the latter case, the greater hardness of the tooth 50 relative to the wheel 22 causes the radiused wheel surfaces 40, 42 to deform in response to impact forces. This deformation allows tightening of the engagement of the tooth 50 on the projection 26. It also helps smooth out irregularities in the radiused surfaces.

As noted above, when the tooth 50 is mounted on the projection 26, the projection 26 is received into the tooth socket 74. The socket 74 has opposite inner surfaces 76 that are preferably essentially parallel to each other and to the opposite outer side surfaces 78 of the tooth 50. When the tooth 50 is mounted on the projection 26, the inner tooth surfaces 76 abut the side surfaces 28 of the projection 26 so that the projection 26 is snugly received into the socket 74. Preferably, one of the outer side surfaces 78 of the tooth 50 similarly abuts the edge surface 34 on the wheel 22. The resulting mounting arrangement includes two, and preferably three, pairs of abutting surfaces to minimize movement of the tooth 50 relative to the wheel 22. In most situations the only relative movement of the tooth 50 during cutting operations is a slight rearward movement of the tooth 50 onto the projection 26. The socket 74 has sufficient clearance for the projection end surface 30 to permit this slight movement.

A hole 70 extends vertically through the top and bottom walls 56, 58 of the tooth 50 and through a forward portion of the socket 74. The hole 70 has a width (or diameter in the case of the round hole 70 shown in FIGS. 3-5) that is less than the width or diameter of the hole 32 in the projection 26. When the tooth 50 is positioned on the projection 26, the holes 32, 70 are aligned, and a roll pin 80 (FIG. 2) is extended through the holes 32, 70. The pin 80 is interference fit into the hole 70 through the tooth 50 and is loosely received through the hole 32 in the projection 26. This arrangement secures the tooth 50 onto the projection 26 while allowing cutting forces on the tooth 50 to tend to tighten the engagement of the tooth 50 on the projection 26 by forcing the projection 26 further into the socket 74. The loose fit of the pin 80 in the hole 32 isolates the pin 80 from impact forces and prevents shearing forces on the pin 80 as a result of the self tightening. The tooth 50 is preferably provided with upper and lower steps 72 adjacent to its forward end portion 52 to further reduce wear on the pin 80. Although the pin 80 normally does not engage the sidewall of the hole 32, it is an important safety feature, especially on reversible cutter wheels. When the rotation of the wheel 22 is reversed, the pin 80 prevents the dislodging of a tooth 50 that hangs up on a tree or other object. It also resists displacement due to centrifugal force.

In use, the installation of the tooth 50 requires only the positioning of the tooth 50 onto the projection 26 and, then, the positioning of a roll pin 80 through the holes 70, 32 using a hammer or other suitable tool. Because of the symmetrical structure of the tooth 50 rearward of the steps 72, the tooth 50 can be installed with either of its outer side surfaces 78 abutting the cutter wheel edge surface 34 and either of its surfaces 56, 58 forming a top surface. In the type of tooth configuration shown in FIG. 2, the teeth 50 are shown with alternate top and bottom surfaces 56, 58. This type of installation provides a good cutting width. It also allows for easy reversing of the orientations of each of the teeth 50 to prolong the life of the teeth 50. When it is desired to remove the tooth 50 from the wheel 22, the pin 80 may easily be disengaged from the holes 32, 70 using a hammer and a roll pin punch. Then, the same tools may be used to slide the tooth 50 off the projection 26. The tooth 50 can be sharpened after being removed from the wheel 22 or, alternatively, can be sharpened while it is still on the wheel 22, which may in turn be still mounted on a machine part, such as the cutter head 2 shown in FIG. 1.

As used herein, the terms "top", "bottom", "horizontal", and the like refer to the u$e orientation shown in FIG. 1. These terms are used to facilitate the description of the invention. It is intended to be understood that the invention may also be used in other orientations different from that shown in FIG. 1.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. Rotary cutting apparatus comprising:
a cutter base mountable for rotation about an axis and defining a circular cutting direction perpendicular to said axis; said base including radially outer peripheral portions with a plurality of projections, and a plurality of edge surface corresponding to said projections, respectively, and extending substantially tangent to said cutting direction; each said projection having opposite side surfaces substantially tangent to said cutting direction, and an end surface extending between said side surfaces; and said base defining a slot between each said edge surface and a radially adjacent one of said side surfaces of the corresponding projection, said slot having an open end radially adjacent to said end surface; and
a plurality of removable teeth, one corresponding to each said projection; each said tooth defining a socket with opposite inner surfaces, and having an outer surface; said projection being snugly received into said socket with said inner surfaces and said outer surface abutting said side surfaces and said edge surface, respectively, to removably secure said tooth to said base; and said socket providing clearance for said end surface to allow cutting forces to tend to tighten engagement of said projection in said socket.

2. The apparatus of claim 1, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

3. The apparatus of claim 1, in which said inner surfaces and said outer surface of each said tooth are essentially parallel to each other.

4. The apparatus of claim 1, in which said cutter base comprises a substantially disk-shaped cutter wheel.

5. The apparatus of claim 4, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

6. The apparatus of claim 1, in which said slot has a closed end opposite said open end, said base defines a confronting surface radially outwardly of said projection, and said tooth has a pair of rear surfaces positioned on opposite sides of said socket and confronting said closed end and said confronting surface, respectively.

7. The apparatus of claim 6, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

8. The apparatus of claim 6, in which said cutter base comprises a substantially disk-shaped cutter wheel.

9. The apparatus of claim 8, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

10. The apparatus of claim 6, in which said tooth has opposite top and bottom portions terminating in an end portion that defines a socket opening through which said projection is received; and each said rear surface extends between said top and bottom portions and is inwardly offset from said end portion to permit said top and bottom portions to extend over opposite top and bottom surfaces of said base beyond said projection to provide additional support for said tooth.

11. The apparatus of claim 10, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

12. The apparatus of claim 10, in which each said projection is substantially rectangular.

13. The apparatus of claim 10, in which said cutter base comprises a substantially disk-shaped cutter wheel.

14. The apparatus of claim 13, in which each said projection has a first hole with a first width extending therethrough, and the corresponding tooth has a second hole with a second width extending therethrough and aligned with said first hole, said second width being less than said first width; and which further comprises a pin interference fit into said second hole and loosely received through said first hole, to further secure said tooth on said projection while maintaining a tendency of cutting forces to tighten engagement of said tooth on said projection.

15. Rotary cutting apparatus comprising:

a cutter base mountable for rotation about an axis and defining a circular cutting direction perpendicular to said axis; said base including radially outer peripheral portions with a plurality of projections extending substantially tangent to said cutting direction; each said projection having opposite side surfaces, and an end surface extending between said side surfaces; and each said projection having a first hole with a first width extending therethrough;

a plurality of removable teeth, one corresponding to each said projection; each said tooth defining a socket with opposite inner surfaces; said projection being snugly received into said socket with said inner surfaces abutting said side surfaces to removably secure said tooth to said base; said socket providing clearance for said end surface to allow cutting forces to tend to tighten engagement of said projection in said socket; and each said tooth having a second hole with a second width extending therethrouqh and aligned with said first hole in the corresponding projection, said second width being less than said first width; and a plurality of pins, one corresponding to each said tooth; each said pin being interference fit into said second hole and loosely received through said first hole, to further secure said tooth on said projection while maintaining a tendency of cutting forces to tighten engagement of said tooth on said projection.

16. The apparatus of claim 15, in which said cutter base comprises a substantially disk-shaped cutter wheel.

17. The apparatus of claim 15, which comprises a pair of confronting surfaces on said base on radially opposite sides of each said projection; and in which each said tooth has a pair of rear surfaces positioned on opposite sides of said socket and confronting said confronting surfaces.

18. The apparatus of claim 17, in which said cutter base comprises a substantially disk-shaped cutter wheel.

19. The apparatus of claim 17, in which said tooth has opposite top and bottom portions terminating in an end portion that defines a socket opening through which said projection is received; and each said rear surface extends between said top and bottom portions and is inwardly offset from said end portion to permit said top and bottom portions to extend over opposite top and bottom surfaces of said base beyond said projection to provide additional support for said tooth.

20. The apparatus of claim 19, in which said cutter base comprises a substantially disk-shaped cutter wheel.

* * * * *

UNITED STATES PATENT AND TRADEMARK OFFICE
CERTIFICATE OF CORRECTION

PATENT NO. : 5,103,882
DATED      : April 14, 1992
INVENTOR(S) : David E. Milbourn It is certified that error appears in the above-identified patent and that said Letters Patent is hereby corrected as shown below:

On the title page, item [56] References Cited, "Berhard" should be --Bernard--.

In item [57] Abstract, line 3, "projections" should read --projection--.

Column 2, line 56, there is a period after "above".

Column 3, line 59, "rake 6" should be -- rake 16 --.

Column 3, line 61, "out" should be -- cut --.

Column 7, line 5, "u$e" should be -- use --.

Claim 1, column 7, line 22, "surface" should be -- surfaces --.

Signed and Sealed this

Twentieth Day of July, 1993

Attest:

MICHAEL K. KIRK

*Attesting Officer*  *Acting Commissioner of Patents and Trademarks*